US011389762B2

(12) United States Patent
Corbet et al.

(10) Patent No.: US 11,389,762 B2
(45) Date of Patent: Jul. 19, 2022

(54) PROCESS AND APPARATUS FOR REMOVAL OF METAL CARBONYLS FROM CRUDE SYNTHESIS GAS

(71) Applicant: L'Air Liquide, Societe Anonyme pour l'Etude et l'Exploitation des Procedes Georges Claude, Paris (FR)

(72) Inventors: Sharon Corbet, Frankfurt am Main (DE); Alfred Gubrinski, Erzhausen (DE); Sophia Schmidt, Frankfurt am Main (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 159 days.

(21) Appl. No.: 16/555,135

(22) Filed: Aug. 29, 2019

(65) Prior Publication Data

US 2020/0070087 A1 Mar. 5, 2020

(30) Foreign Application Priority Data

Sep. 3, 2018 (EP) .................................... 18020425

(51) Int. Cl.
*B01D 53/14* (2006.01)
*B01D 53/48* (2006.01)
(Continued)

(52) U.S. Cl.
CPC ..... *B01D 53/1425* (2013.01); *B01D 53/1406* (2013.01); *B01D 53/1462* (2013.01);
(Continued)

(58) Field of Classification Search
None
See application file for complete search history.

(56) References Cited

U.S. PATENT DOCUMENTS 6,488,742 B1 * 12/2002 Grunewald ........ B01D 53/1425
95/173

FOREIGN PATENT DOCUMENTS

DE 197 16 310 10/1998
DE 100 23 661 11/2001
(Continued)

OTHER PUBLICATIONS

Search Report and Written Opinion for EP 18020425, dated Dec. 13, 2018 (machine translation).
(Continued)

*Primary Examiner* — Daniel Berns
(74) *Attorney, Agent, or Firm* — Justin K. Murray (57) ABSTRACT

The invention relates to a process for removal of metal carbonyls from crude synthesis gas in a gas scrubbing process with a physical scrubbing medium. Scrubbing medium laden with hydrogen sulfide ($H_2S$) and metal carbonyls is sent to a treatment vessel having a residence time region and a scrubbing region. Metal carbonyls are precipitated from the laden scrubbing medium as metal sulfides in the residence time region. The scrubbing region is supplied with a regenerated scrubbing medium. According to the invention it is provided that the residence time region and the scrubbing region are separated from one another by a gas-permeable tray, a regenerated scrubbing medium-comprising liquid layer adjacent to the gas-permeable tray is formed in the scrubbing region, metal carbonyls outgassing from the residence time region pass through the gas-permeable tray and are absorbed by regenerated scrubbing medium in the scrubbing region, wherein scrubbing medium comprising metal carbonyls is obtained and metal carbonyls outgassing from the residence time region are cooled by the liquid layer. The invention further relates to a treatment vessel, to the use of the process, treatment vessel or appa-
(Continued)

ratus according to the invention in a gas scrubbing process with methanol as the physical scrubbing medium and to the use of the treatment vessel in a process according to the invention.

16 Claims, 3 Drawing Sheets

(51) Int. Cl.
- *B01D 53/52* (2006.01)
- *B01D 53/64* (2006.01)
- *B01D 53/72* (2006.01)
- *B01D 53/78* (2006.01)
- *B01D 53/96* (2006.01)
- *B01D 53/18* (2006.01)

(52) U.S. Cl.
CPC ......... *B01D 53/1493* (2013.01); *B01D 53/18* (2013.01); *B01D 53/48* (2013.01); *B01D 2252/2021* (2013.01)

(56) References Cited

FOREIGN PATENT DOCUMENTS

| DE | 10 2007 051181 | 4/2009 |
| WO | WO 98/47602 | 10/1998 |
| WO | WO 03/022397 | 3/2003 |

OTHER PUBLICATIONS

Myung Won Seo, et al., "Methanol absorption characteristics for the removal of H2S (hydrogen sulfide), COS (carbonyl sulfide) and CO2 (carbon dioxide) in a pilot-scale biomass-to-liquid process," ENERGY, Bd. 66, 1, Mar. 1, 2014, 56-62.

"Rectisol Process," Ullmann's Encyclopedia of Industrial Chemistry, 6th Ed., vol. 15, Dec. 2002, pp. 399-407.

* cited by examiner

PROCESS AND APPARATUS FOR REMOVAL OF METAL CARBONYLS FROM CRUDE SYNTHESIS GAS

CROSS REFERENCE TO RELATED APPLICATION

This application claims the benefit of priority under 35 U.S.C, § 119 (a) and (b) to European patent application No. EP18020425.7, filed Sep. 3, 2018, the entire contents of which are incorporated herein by reference.

FIELD OF THE INVENTION

The invention relates to a process for removal of metal carbonyls from crude synthesis gas in a gas scrubbing process with a physical scrubbing medium. The invention further relates to a treatment vessel for removal of metal carbonyls from crude synthesis gas, to an apparatus comprising such a treatment vessel and to the use of the process according to the invention or of the treatment vessel according to the invention or of the apparatus in a gas scrubbing process with methanol as the physical scrubbing medium.

BACKGROUND OF THE INVENTION

Processes for removal of undesired concomitants from industrial crude gases by physical or chemical absorption are known from the prior art. Thus such processes may be used to remove down to trace amounts unwanted, acidic constituents of crude synthesis gases produced by gasification or reforming of carbon-containing inputs, for example carbon dioxide ($CO_2$) and hydrogen sulfide ($H_2S$) but also carbonyl sulfide (COS), mercaptans and hydrogen cyanide (HCN), from the wanted synthesis gas constituents such as hydrogen ($H_2$) and carbon monoxide (CO).

A known and often employed process is the Rectisol process which is described in principle in Ullmann's Encyclopedia of Industrial Chemistry, 6th Ed. Vol. 15, p. 399 et seq. In the Rectisol process the abovementioned unwanted disruptive components are absorbed by cold methanol, i.e. methanol cooled significantly below ambient temperature, as an absorbent or scrubbing medium, wherein intensive mass transfer between the crude gas and the absorption medium/scrubbing medium takes place in an absorber column also known as an absorber or scrubbing column. The solubility of the unwanted gas constituents increases drastically with decreasing temperature of the methanol and increasing pressure while remaining practically constant for hydrogen and carbon monoxide. Methanol additionally has the advantage of retaining a low viscosity even at temperatures down to −75° C., thus making it usable on a large industrial scale even at very low temperatures.

The production of synthesis gas from input materials comprising metallic trace constituents (for example coal) forms metal carbonyls which can impede the use of synthesis gas in a multiplicity of chemical production processes. The metal carbonyls are complexes in which carbon monoxide (CO) is coordinatively bonded to a metal atom. The metal carbonyls are in particular nickel carbonyls, for example tetracarbonylnickel(0) ($[Ni(CO)_4]$), and iron carbonyls, for example pentacarbonyliron(0) ($[Fe(CO)_5]$). The metal carbonyls are generally readily soluble in the scrubbing media used in gas scrubbings and can therefore be removed from the crude synthesis gas. However, especially when using physical scrubbing media such as methanol metal carbonyls can lead to problems during subsequent regeneration of the scrubbing medium, for example during hot regeneration, since metal carbonyls react with hydrogen sulfide ($H_2S$) present in the laden scrubbing medium to afford metal sulfides preferentially in warm or hot regions of a gas scrubbing plant. The underlying equilibrium reaction is also driven by the poor solubility of the metal sulfides which are removed from the reaction equilibrium by precipitation, such as for example by the reaction between pentacarbonyliron(0) and hydrogen sulfide ($H_2S$) to afford iron(II) sulfide, carbon monoxide and hydrogen:

Since metal sulfides are poorly soluble to insoluble in virtually all commonly used solvents all metal carbonyl- and hydrogen sulfide-containing crude synthesis gases in the gas scrubbing processes suffer from the problem that through deposits metal sulfides can result in obstructions or blockages in the affected plant parts.

For removal of metal carbonyls WO 98/47602 provides a process in which by removal of carbon monoxide, for example by stripping from the scrubbing medium, the above equilibrium reaction is shifted to the side of the metal sulfides, thus bringing about an intentional precipitation of the metal sulfides out of the scrubbing medium. To this end the laden scrubbing medium is decompressed into a decompression vessel, thus releasing a decompression gas that also contains carbon monoxide (CO). The scrubbing medium depleted by a certain amount of CO is subsequently transferred into a reaction and settling vessel in which according to the residence time in the vessel and the type of the metal the metal carbonyls are largely completely removed from the scrubbing medium by precipitation as metal sulfides. Due to the longer residence time of the suspension comprising metal sulfides in the reaction and settling vessel such containers are also referred to as residence time vessels. The supernatant from the suspension, i.e. the scrubbing medium largely freed of metal carbonyls, is subsequently withdrawn from the residence time vessel and sent to a hot regeneration.

The decompression gas released in the decompression vessel and withdrawn from the decompression vessel also contains at this point in the process undesirably released metal carbonyls.

In order also to make these metal carbonyls available to the precipitation as metal sulfides the decompression gas is initially cooled and subsequently rescrubbed with regenerated scrubbing medium in a separate apparatus known as a carbonyl scrubber. The scrubbing medium laden with metal carbonyls is subsequently recycled into the decompression vessel, withdrawn therefrom and sent to the residence time vessel. A cooling of the decompression gas is necessary since this significantly increases the amount of the gases absorbed in the scrubbing medium of the carbonyl scrubber due to better absorption at lower temperatures.

The process known from the prior art has several disadvantages.

The cooling of the decompression gases liberated from the decompression vessel requires a separate active heat exchanger with a cooling water feed in order to effect sufficient cooling of the decompression gases for the subsequent absorption in the carbonyl scrubber.

The use of a plurality of autarkic apparatuses connected by pipelines—carbonyl scrubber, decompression vessel, cooler and residence time vessel—is also associated with high space demands and apparatus construction costs.

Furthermore the amount of carbon monoxide (CO) liberated in the decompression vessel is often not sufficient to shift the equilibrium of the above equilibrium reaction far enough to the product side for the metal carbonyls to be removed as completely as possible.

SUMMARY OF THE INVENTION

The present invention accordingly has for its object to at least partially overcome the above-mentioned disadvantages of the prior art.

It is a particular object of the present invention to specify a process by which, in the removal of metal carbonyls from crude synthesis gases in gas scrubbing processes, the apparatus construction costs and space demands may be reduced.

It is a further object of the present invention to specify a process in which a heat exchanger active for the cooling of the decompression gases may be dispensed with.

It is a further object of the present invention to specify a process by which the yield of metal sulfides may be increased so that metal carbonyls are largely completely removed.

It is a further object of the present invention to specify an apparatus or a use which at least partially achieves at least one of the objects recited above.

The objects of the invention are at least partially solved by a process for removal of metal carbonyls from crude synthesis gas in a gas scrubbing process with a physical scrubbing medium in which a scrubbing medium laden at least with hydrogen sulfide ($H_2S$) and metal carbonyls from an absorption apparatus is sent to a treatment vessel having a residence time region and a scrubbing region, wherein the metals of the metal carbonyls are at least partially precipitated from the laden scrubbing medium as metal sulfides in the residence time region and the scrubbing region is supplied with a regenerated scrubbing medium. According to the invention it is provided that the residence time region and the scrubbing region are separated from one another by a gas-permeable tray, a regenerated scrubbing medium-comprising liquid layer adjacent to the gas-permeable tray is formed in the scrubbing region, metal carbonyls outgassing from the residence time region pass through the gas-permeable tray and are at least partially absorbed by the regenerated scrubbing medium in the scrubbing region, wherein a scrubbing medium comprising metal carbonyls is obtained and the metal carbonyls outgassing from the residence time region are cooled by the liquid layer.

The term "metal carbonyls" is in principle to be understood as meaning any metal complexes in which carbon monoxide molecules are coordinatively bonded to a central metal atom. Metal carbonyls particularly relevant to the subject-matter of the invention are iron(0) and nickel(0) carbonyls, in particular tetracarbonylnickel(0) ($[Ni(CO)_4]$) and pentacarbonyliron(0) ($[Fe(CO)_5]$).

The term "crude synthesis gas" is to be understood as meaning a synthesis gas which (still) comprises undesired constituents, in particular acidic constituents such as for example hydrogen sulfide ($H_2S$), carbon dioxide ($CO_2$), mercaptans and hydrogen cyanide (HCN), of which it is to be freed by gas scrubbing in a suitable scrubbing medium. Desired synthesis gas constituents are carbon monoxide (CO) and hydrogen ($H_2$). The synthesis gas may be a synthesis gas altered by a synthesis gas shift reaction, i.e. a synthesis gas in which, in order to obtain hydrogen, carbon monoxide has been at least partially catalytically reacted with water to afford carbon dioxide and hydrogen.

A "physical scrubbing medium" is to be understood as meaning a scrubbing medium where the solubility of the particular gas in the scrubbing medium is brought about by physical interactions. Suitable scrubbing media are methanol, 1-methyl-2-pyrrolidone (NMP), a mixture of dimethyl ethers of polyethylene glycol and propylene carbonate (4-methyl-1,3-dioxolan-2-one) as well as mixtures thereof or therewith. A preferred scrubbing medium is methanol.

The treatment vessel has at least one residence time region and a scrubbing region. In the residence time region the metals of the metal carbonyls are converted into metal sulfides by reaction with a sulfur compound present in the scrubbing medium, in particular hydrogen sulfide. Due to the poor solubility of the metal sulfides in most commonly used scrubbing media the metal sulfides do not remain in solution, i.e. are precipitated out on account of their low solubility product. The precipitation reaction requires a particular time according to the type of the metal, the concentrations present, the temperature and the pressure. It is preferable when the precipitation reaction in the residence time region is performed at high temperatures. Since the completest possible precipitation and sedimentation of the precipitated sulfides is sought the treatment vessel is constructed such that a defined liquid volume of the laden scrubbing medium to be treated resides in the residence time region of the treatment vessel for a sufficient time. The residence time for the conversion of the metal carbonyls to afford metal sulfides is thus chosen according to the type and composition of the metal carbonyls. The precipitation of nickel sulfides preferably requires residence times of 1 to 16 hours, particularly preferably of at least 3 hours. The precipitation of nickel sulfides preferably requires residence times of 5 to 80 minutes, particularly preferably of 15 to 50 minutes. In one example of the process a plurality of treatment vessels may be used for different metal carbonyls which are withdrawn from the plurality of treatment vessels from different regions of the absorption apparatus.

One or more decompression stages are regularly arranged upstream of the treatment vessel. The resulting low pressure in the treatment vessel has the result that unconverted metal carbonyls outgas from the scrubbing medium in particular at the elevated temperatures prevailing in the residence time region. In order to make the outgassed metal carbonyls available to the precipitation as metal sulfides these are to be rescrubbed by a scrubbing medium and subsequently to be recycled into the residence time region of the treatment vessel for example. The rescrubbing of the metal carbonyls occurs in the scrubbing region of the residence time vessel. This affords a scrubbing medium containing metal carbonyls. In order to absorb the metal carbonyls in the scrubbing region of the treatment vessel as completely as possible the scrubbing region is supplied with a regenerated scrubbing medium for absorption of the metal carbonyls. In the context of the subject-matter of the invention a "regenerated" scrubbing medium is to be understood as meaning a scrubbing medium is either partially or completely regenerated, i.e. is not laden with gas constituents or is laden with gas constituents to such a small extent that it is suitable for absorption of metal carbonyls.

The colder the regenerated scrubbing medium and the metal carbonyls during the absorption the more efficient the absorption of the metal carbonyls in the regenerated scrubbing medium. The residence time region and the scrubbing region of the treatment vessel are therefore separated from one another by a gas-permeable tray upon which a liquid layer comprising a regenerated scrubbing medium is formed. The metal carbonyls are absorbed by the supplied regenerated scrubbing medium in the scrubbing region of the treatment vessel and continuously cooled by the liquid layer adjacent to the gas-permeable tray. The tray is gas-permeable in order that the metal carbonyls gaseous under process conditions can pass through the tray from the residence time region in the direction of the scrubbing region.

In the context of the subject-matter of the invention "gas-permeable tray" is to be understood as meaning that the tray is permeable to gaseous substances, for example metal carbonyls gaseous under the process conditions. On the contrary the gas-permeable tray is not permeable to a liquid or is at least constructed such that a liquid layer can collect on the gas-permeable tray. In one example the gas-permeable tray is a tray which on account of its macroscopic geometric configuration may be traversed by a gas but on which a layer of a liquid can simultaneously collect, thus making the tray at least partially impermeable to the liquid. In another example the gas-permeable tray is a tray which on a microscopic level is configured such that it is passable by a gas but not by a liquid. An example of such a tray is a membrane permeable to gases and impermeable to liquids.

The process according to the invention has at least the advantages that firstly no separate cooler for cooling the metal carbonyls is required and secondly the residence time region and the scrubbing region may be realized in a single vessel. This means that the residence time vessel and the carbonyl scrubber need not be constructed as distinct units and a cooler interposed between the residence time vessel and the carbonyl scrubber having a dedicated cooling water supply for cooling the metal carbonyls is not necessary.

A preferred embodiment of the process according to the invention is characterized in that the scrubbing medium comprising metal carbonyls is transferred from the scrubbing region into the residence time region in order to precipitate as metal sulfides the metals in the scrubbing medium comprising metal carbonyls in the residence time region of the treatment vessel.

In this embodiment a direct fluidic connection between the scrubbing region and the residence time region is realized for example, so that all metal carbonyls supplied from the laden scrubbing medium are precipitated in the residence time region of the treatment vessel as metal sulfides.

A preferred embodiment of the process according to the invention is characterized in that the scrubbing medium laden at least with hydrogen sulfide ($H_2S$) and metal carbonyls is sent to a decompression regeneration for removal of carbon monoxide (CO) before it is sent to the treatment vessel.

The reaction of the metal carbonyls with hydrogen sulfide to afford metal sulfides and carbon monoxide is an equilibrium reaction which may be shifted to the product side, i.e. to the side of the metal sulfides, by removal of carbon monoxide from the reaction equilibrium. For this reason, carbon monoxide is advantageously removed by means of a decompression regeneration before supplying the laden scrubbing medium to the treatment vessel. In the decompression regeneration the pressure of the laden scrubbing medium withdrawn from the absorption apparatus is reduced so that the solubility of the gases absorbed in the laden scrubbing medium increases according to Henry's law. The decompression gas obtained in the decompression regeneration also contains carbon monoxide, thus amplifying the formation of metal sulfides in the laden scrubbing medium. The pressure in the residence time region of the treatment vessel is preferably 1 to 20 bar, more preferably at least 3 bar. The pressure to be applied for the residence time region depends primarily on the pressure of the decompression regeneration immediately upstream of the residence time region.

The scrubbing medium laden at least with hydrogen sulfide ($H_2S$) and metal carbonyls may be supplied with a stripping gas for additional stripping of carbon monoxide (CO) in the decompression regeneration.

Suitable stripping gases are inert gases such as for example nitrogen. The stripping gas advantageously amplifies the removal of carbon monoxide. The more carbon monoxide is removed before the sending to the treatment vessel the more metals are precipitated out as metal sulfides in the residence time region of the treatment vessel. This further increases the yield of the valuable gas carbon monoxide. Valuable gases stripped out during the decompression regeneration such as carbon monoxide are recompressed and sent back to the crude synthesis gas stream before subsequently passing back into the absorption apparatus for gas scrubbing.

A preferred embodiment of the process according to the invention is accordingly characterized in that the decompression regeneration affords a decompression gas which is recompressed and recycled to the absorption apparatus as recycle gas.

It is further advantageous when the decompression regeneration comprises a plurality of pressure stages.

The plurality of pressure stages of the decompression regeneration is preferably arranged in series, wherein the pressure decreases from pressure stage to pressure stage. The decompression gases obtained in the individual pressure stages are recompressed, combined and recycled to the absorption apparatus as a recycle gas stream. The pressure in the recompressed recycle gas stream corresponds to the pressure in the absorption apparatus and is typically 10 to 100 bar.

A preferred embodiment of the process according to the invention is characterized in that the scrubbing medium laden at least with hydrogen sulfide ($H_2S$) and metal carbonyls is warmed before it is sent to the treatment vessel. The warmed laden scrubbing medium preferably has a temperature of 0° C. to 150° C., more preferably of at least 40° C.

The reaction of metal carbonyls with hydrogen sulfide to afford metal sulfides and carbon monoxide requires a certain heat input to achieve the activation energy but upon establishment of a thermodynamic equilibrium is shifted to the side of the reaction products by further increases in the heat input. Carbon monoxide is simultaneously also desorbed by warming. Carbon monoxide has a low Henry coefficient in respect of all customary scrubbing media used for gas scrubbing of synthesis gases. Since the Henry coefficient is a function of temperature and decreases with increasing temperature the yield of carbon monoxide stripped from the scrubbing medium may be further increased by increasing the temperature. The amount of metals precipitated as metal sulfides in the treatment vessel is likewise increased.

The objects of the invention are moreover at least partially solved by a treatment vessel for removal of metal carbonyls from crude synthesis gas comprising a residence time region for precipitating solids from a solution or suspension; a first feed conduit for supplying the solution or suspension to the residence time region; a first discharge conduit for discharging precipitated solids from the residence time region; a second discharge conduit for discharging the supernatant of the solution or suspension obtained by precipitating the solids from the residence time region; a scrubbing region for absorption of gas constituents ejected from the solution or suspension; a second feed conduit for supplying regenerated scrubbing medium to the scrubbing region. According to the invention it is provided that the scrubbing region and the residence time region are connected to one another via a fluidic connection and the residence time region and the scrubbing region of the treatment vessel are separated from one another by a gas-permeable tray.

The treatment vessel according to the invention has a scrubbing region and a residence time region. The scrubbing region and residence time region are separated from one another by a gas-permeable tray, i.e. in particular spatially separated from one another by the gas-permeable tray. The residence time region serves for precipitating solids from a solution or a suspension. In other words the residence time region is supplied with either a solution or a suspension from which a solid is precipitated out in the residence time region. The term "precipitating" may be understood as meaning that a substance previously dissolved in the solution or suspension becomes insoluble as a result of a chemical reaction or change in the ambient conditions, i.e. forms a solid phase or is converted into a solid phase already present. However, it can also mean that a solid already present in the suspension, i.e. previously precipitated solid, undergoes sedimentation in the residence time region and is thus more easily removable as a solid, for example through formation of larger agglomerates.

The residence time region has a first feed conduit for supplying the solution or suspension. The residence time region moreover has a first discharge conduit for discharging the solids once these have been precipitated in the residence time region. The solids are discharged from the residence time region of the treatment vessel in the form of a solids-rich suspension. The solids-rich suspension is often referred to simply as "sludge". In the context of the subject-matter of the invention this may be a sludge having a high proportion of metal sulfides. The second discharge conduit serves for discharging the supernatant of the solution or suspension obtained by precipitation of the solids. The supernatant comprises a very small proportion of solids, if any. In the context of the subject-matter of the invention the supernatant is for example a scrubbing medium which may subsequently be sent to a hot regeneration in order that it may subsequently be reused in an absorption apparatus.

The treatment vessel has a scrubbing region for absorption of gas constituents ejected from the solution or suspension. In order to absorb gas constituents the treatment vessel has a second feed conduit for supplying regenerated scrubbing medium to the scrubbing region. In the scrubbing region constituents outgassing from a solution or suspension in the residence time region are absorbable by the regenerated scrubbing medium in the scrubbing region.

A preferred embodiment of the treatment vessel according to the invention is characterized in that the residence time region, the scrubbing region and the gas-permeable tray are integrated into a single housing of the treatment vessel.

Integration into a single housing allows the treatment vessel to be constructed in a space-saving fashion. Integration into one housing is realizable as a result of the separation of the scrubbing region and the residence time region by the gas-permeable tray. In operation a liquid layer is formed on the gas-permeable tray. Constituents outgassing from the residence time region are coolable by the liquid layer. This makes it possible to eschew a separate cooler so that no additional pipelines are required and the scrubbing region and the residence time region are integrable into a single housing.

A preferred embodiment of the treatment vessel according to the invention is characterized in that the gas-permeable tray is in the form of a liquid collection tray, preferably a chimney tray.

Liquid collection trays, in particular chimney trays, can be constructed such that the height of the liquid layer formed is adjustable as required. Depending on the cooling effect to be achieved by the liquid layer the chimney tray may be constructed such that a relatively high or relatively low liquid layer is formed in operation.

A preferred embodiment of the treatment vessel according to the invention is characterized in that the residence time region of the treatment vessel has a reaction zone and a settling zone.

A separation into a reaction zone and a settling zone is advantageous to establish certain reaction conditions in the reaction zone and also to improve the settling of solids in the settling zone of the residence time region. Thus the reaction zone may for example have a heating apparatus to promote precipitation of a metal sulfide from a solution or suspension comprising metal carbonyls. The reaction zone may also comprise certain internals to increase the surface area of the reaction zone in order thus to ensure the greatest possible surface area for crystal nucleation centres. The setting zone may also be constructed to facilitate sedimentation of the solids precipitated in the reaction zone.

A preferred embodiment of the treatment vessel according to the invention is accordingly characterized in that settling zone of the residence time region comprises a conical tray for collecting the precipitated solids.

Furthermore, a preferred embodiment of the treatment vessel according to the invention is accordingly characterized in that packing bodies and/or structured packings are arranged in the reaction zone to increase the internal surface area of the reaction zone.

It is preferable when the packing bodies are arranged irregularly. These may be customary packing bodies made of ceramics, metal or plastic that are known to those skilled in the art and used in packing body dumped beds. Examples of such packing bodies are Raschig rings®, Pall rings® or Berl saddles. However, any combination of material and packing body shape capable of withstanding the reaction conditions and suitable for increasing the surface area of the reaction zone may be used in principle.

The reaction zone may have a dedicated inlet and an outlet, wherein the reaction zone is separated from the settling zone by the inlet and/or the outlet.

A preferred embodiment of the treatment vessel according to the invention is characterized in that the treatment vessel does not comprise a heat exchanger.

The construction of the treatment vessel, i.e. the separation of the scrubbing region and the residence time region by a gas-permeable tray, makes it possible to eschew a separate heat exchanger for cooling constituents outgassing from the residence time region. In particular an active heat exchanger having a dedicated cooling medium is not required. A typical example of an active heat exchanger is a tube bundle heat exchanger.

It is preferable when the treatment vessel does not comprise an indirect heat exchanger. The inventive construction of the treatment vessel allows direct and thus more efficient cooling of constituents degassing from the residence time region by the liquid layer formable in the scrubbing region, thus making it possible to eschew a dedicated indirect heat exchanger.

A preferred embodiment of the treatment vessel according to the invention is characterized in that the fluidic connection is configured for transferring a fluid from the scrubbing region to the residence time region of the treatment vessel.

Thus, constituents absorbed in the scrubbing region, for example metal carbonyls, are recycled into the residence time region of the treatment vessel and precipitated as metal sulfides therein. This makes it possible to achieve complete or at least virtually complete removal of metal carbonyls by precipitation as metal sulfides.

The objects of the invention are further at least partially solved by an apparatus for gas scrubbing of crude synthesis gas, wherein the apparatus comprises a treatment vessel according to the invention.

The apparatus may be an apparatus for gas scrubbing of crude synthesis gases known to those skilled in the art for example. The apparatus may include for example one or more absorption apparatuses, a plurality of apparatuses for regeneration of the scrubbing medium used for the gas scrubbing and a distillation apparatus for separation of water from the scrubbing medium, wherein the abovementioned components of the apparatus and the treatment vessel according to the invention are in contact with one another via fluidic connections.

The objects of the invention are moreover at least partially solved by the use of the process according to the invention, the use of the treatment vessel according to the invention or the use of the apparatus according to the invention in a gas scrubbing process with methanol as the physical scrubbing medium.

The objects of the invention are moreover at least partially solved by the use of the treatment vessel according to the invention in a process according to the invention.

BRIEF DESCRIPTION OF THE DRAWINGS

The invention is more particularly elucidated hereinbelow by way of examples without in any way limiting the subject-matter of the invention. Further features, advantages and possible applications of the invention will be apparent from the following description of the working examples in connection with the drawings.

In the figures.

DETAILED DESCRIPTION OF THE INVENTION

Figure 1:
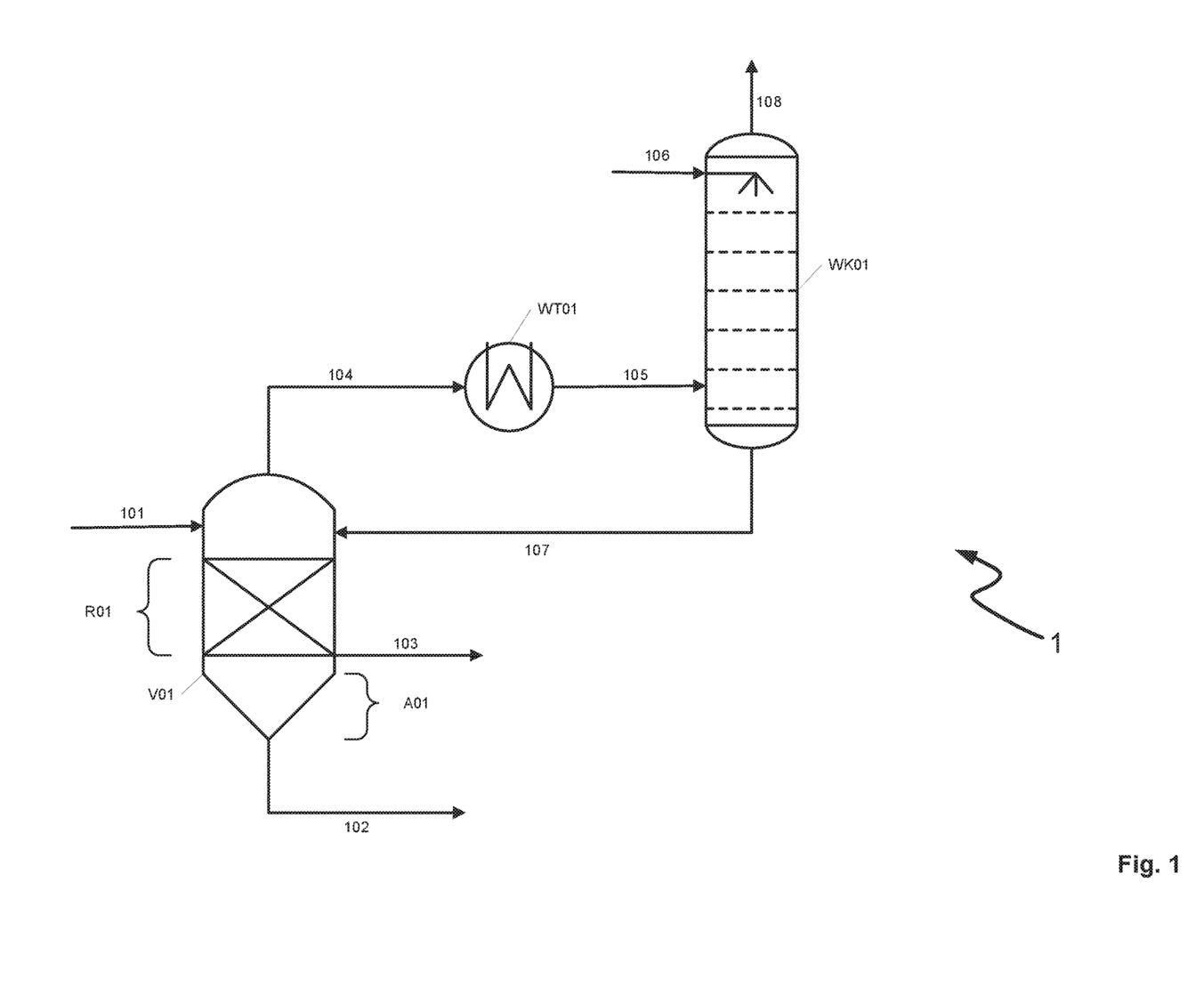
FIG. 1 shows a schematic process flow diagram of a prior art process for removal of metal carbonyls.

FIG. 1 shows a schematic diagram of parts of a prior art process 1 for removal of metal carbonyls from a crude synthesis gas in a gas scrubbing process with methanol as the physical scrubbing medium.

Methanol withdrawn from an absorption apparatus (not shown) and laden with at least hydrogen sulfide and metal carbonyls passes through several stages of a decompression regeneration (not shown) and is sent via conduit 101 to residence time vessel V01. In the residence time vessel V01 equipped with a reaction zone R01 and a settling zone A01 metal carbonyls present in the methanol depleted of carbon monoxide react with hydrogen sulfide to afford metal sulfides. In the reaction zone and settling zone R01, A01 of the residence time vessel V01 metal carbonyls are largely completely converted into metal sulfides at a residence time of at least 5 hours. Metal sulfides undergo sedimentation in the conical settling zone A01 and are withdrawn via conduit 102 as sulfide sludge. The supernatant of the precipitate containing only very few solid metal sulfides consists largely of laden methanol. It is withdrawn via conduit 103 and subsequently sent to a hot regeneration (not shown). Metal carbonyls outgassing from the laden methanol are withdrawn via conduit 104, cooled in indirect heat exchanger WT01 and supplied via conduit 105 to carbonyl scrubbing column WK01. Carbonyl scrubbing column WK01 is supplied in the top region with regenerated methanol via conduit 106 and a liquid distributor connected thereto. Metal carbonyls cooled by WT01 are largely absorbed by regenerated methanol by absorption in countercurrent processes in WK01. Methanol laden with metal carbonyls is subsequently recycled to residence time vessel V01 via conduit 107, thus making available to a precipitation as metal sulfides the metal carbonyls not originally converted into metal sulfides in V01. Valuable gases not absorbed by regenerated methanol in WK01 such as carbon monoxide or hydrogen are withdrawn via conduit 108, recompressed and recycled to the absorption apparatus as a recycle gas stream (not shown).

Indirect heat exchanger WT01 which has a dedicated cooling water supply is required for cooling the metal carbonyls outgassing from V01. Due to the high temperatures prevailing in the residence time vessel a cooling of the metal carbonyls is required in order for these to be rescrubbed (absorbed) fully by regenerated methanol in WK01.

Figure 2:
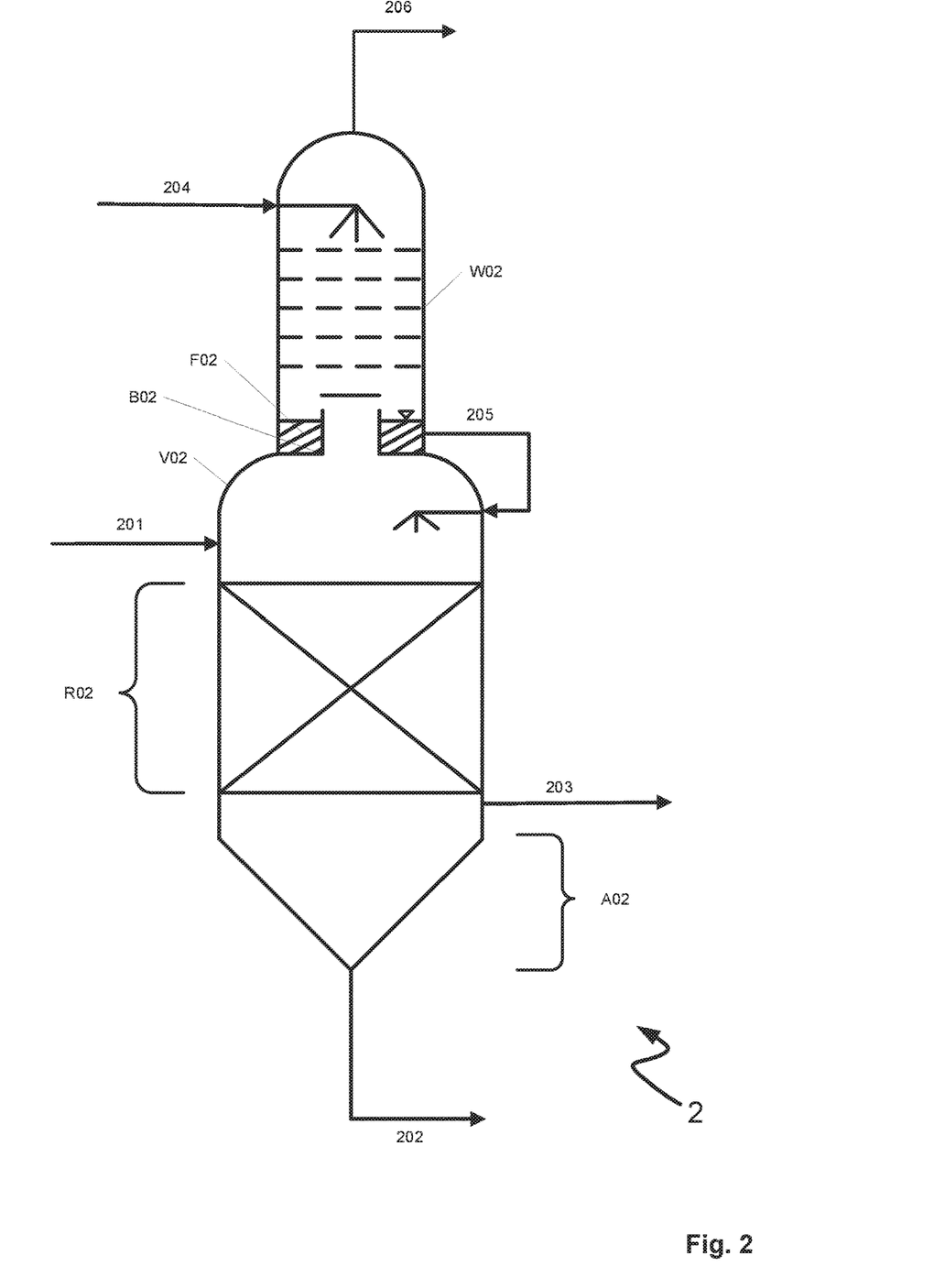
FIG. 2 shows a schematic diagram of an inventive treatment vessel and FIG. 3 shows a schematic process flow diagram of an inventive process for removal of metal carbonyls using a treatment vessel according to the invention.

FIG. 2 shows a schematic diagram of an inventive treatment vessel 2 for removal of metal carbonyls from crude synthesis gas.

Treatment vessel 2 has a lower residence time region V02 and an upper scrubbing region W02. Residence time region V02 and scrubbing region W02 are separated from one another by a gas-permeable tray B02. Gas-permeable tray B02 is in the form of a chimney tray in the example of FIG. 2. Residence time region V02 has an upper reaction zone R02 and a lower settling zone A02. Reaction zone R02 is filled with irregular packing bodies for increasing the internal surface area of the reaction zone R02. Via a first feed conduit, conduit 201, residence time region V02 of the treatment vessel 2 may be supplied for example with a solution of methanol laden with metal carbonyls and hydrogen sulfide. In reaction zone R02 metal carbonyls are convertible by reaction with hydrogen sulfide into metal sulfides which after precipitation in reaction zone R02 can collect as sulfide sludge in settling zone A02. Via a first discharge conduit, conduit 202, the metal sulfides collected as sulfide sludge may be discharged from the treatment vessel 2. The supernatant generated in addition to the precipitate (sulfide sludge) may be discharged from treatment vessel 2 via a second discharge conduit, conduit 203.

Residence time region V02 and scrubbing region W02 are integrated into a single housing and the treatment vessel 2 is thus in the form of an apparatus integrating a plurality of functions. Residence time region V02 and scrubbing region W02 adjoin directly via the gas-permeable tray without spatial separation and/or spacing apart of these two regions and/or connection of the two regions by a pipeline for example. In order to realize a residence time region V02 and scrubbing region W02 in a common housing the housing may for example have at least one welded joint in the region of the gas-permeable tray B02. The joint need not necessarily be an insoluble atomic-level joint. A soluble mechanical joint of the housing parts is likewise conceivable.

Gas-permeable tray B02 is in the form of a chimney tray in the example of FIG. 2. This design allows the gas-permeable tray B02 to be traversed, i.e. passed through, from bottom to top by gas constituents ejected in the residence time region V02. Via a second feed conduit, conduit 204, scrubbing region W02 may be supplied with a scrubbing medium, for example regenerated methanol. Conduit 204 has a liquid distributor connected to it. Scrubbing medium supplied via conduit 204 absorbs gas constituents ejected from residence time region V02 and collects as a liquid layer F02 on gas-permeable tray B02. The configuration of the gas-permeable tray B02 as a chimney tray allows gas-permeable tray B02 to operate as a liquid collection tray. The formation of the liquid layer F02 ensures that gases comprising metal carbonyls ejected from residence time region V02 are cooled and thus that more metal carbonyls are absorbed in scrubbing medium supplied via conduit 204. Due to the cooling brought about by liquid layer F02 treatment vessel 2 does not have a dedicated active heat exchanger in contrast to the arrangement described in FIGS. 1.

Scrubbing region W02 and residence time region V02 are connected to one another via a fluidic connection, conduit 205. Liquid collected via gas-permeable tray B02 which contains gas constituents ejected from residence time region V02 is recycled via conduit 205 to the residence time region and therein initially enters reaction zone R02 in which for example a reaction of metal carbonyls absorbed in the scrubbing medium of the liquid layer F02 with hydrogen sulfide dissolved in the scrubbing medium to afford metal sulfides can take place. Precipitated metal sulfides collect in settling zone A02 and may be discharged from the treatment vessel 2 via conduit 202.

Gas constituents not absorbed in scrubbing medium supplied via conduit 204 may be withdrawn from treatment vessel 2 via conduit 206.

Figure 3:
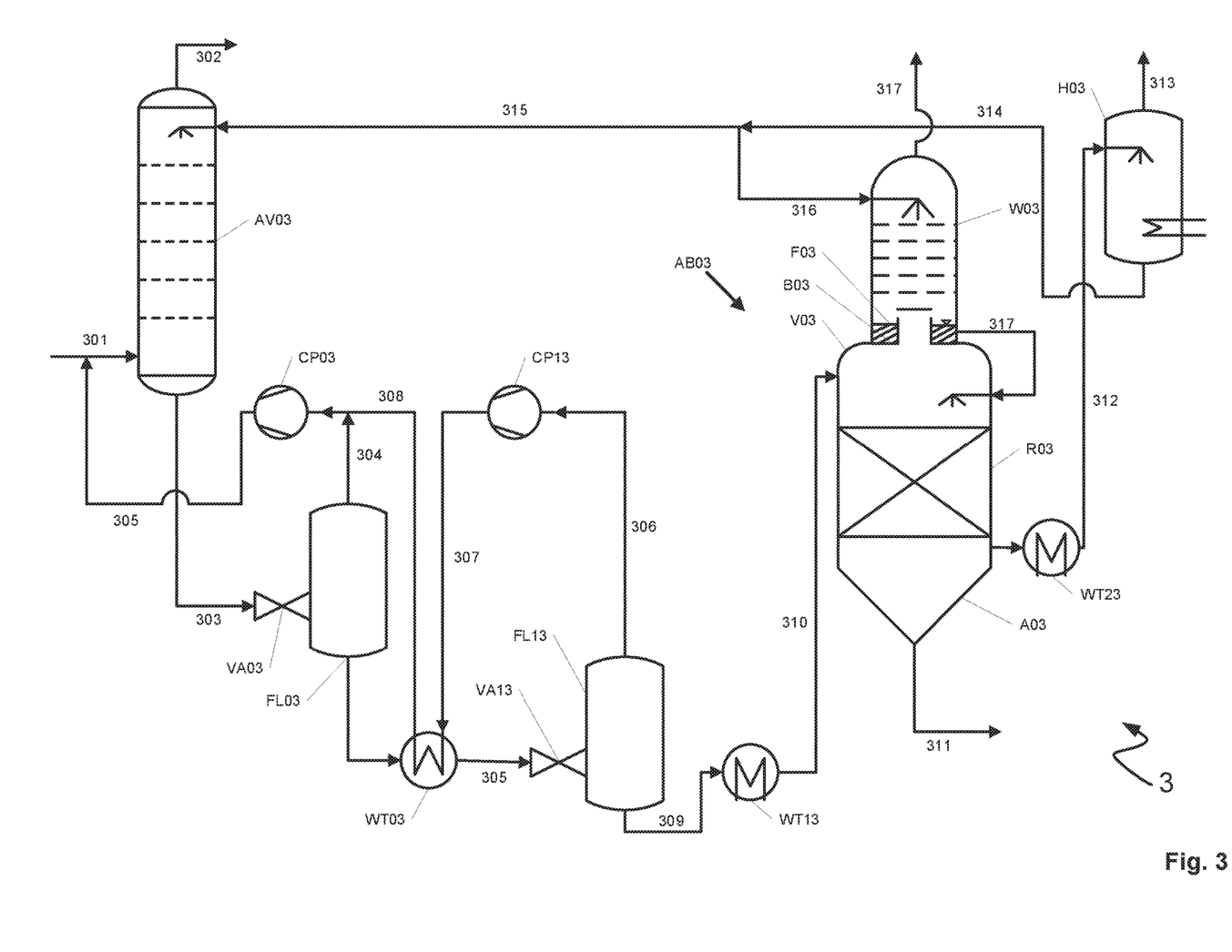

FIG. 3 shows a schematic process flow diagram of an inventive process 3 for removal of metal carbonyls from crude synthesis gas using an inventive treatment vessel, here designated AB03, with methanol as the physical scrubbing medium.

An absorption apparatus AV03 is supplied via conduit 301 with a crude synthesis gas at a pressure of about 40 bar. Absorption apparatus AV03 is traversed from top to bottom with methanol as the scrubbing medium, wherein undesired constituents such as hydrogen sulfide and carbon dioxide are removed from synthesis gas supplied via conduit 301. Absorption apparatus AV03 has a plurality of compartments separated by chimney trays for selective removal of certain gas constituents in each compartment (not shown). Purified synthesis gas exits absorption apparatus AV03 via conduit 302. Methanol laden with primarily undesired constituents is withdrawn from absorption apparatus AV03 via conduit 303, decompressed to 12 bar via decompression valve VA03 and sent to the decompression vessel FL03. In decompression vessel FL03 laden methanol is partially regenerated (decompression regeneration) to liberate a decompression gas containing carbon monoxide in addition to other valuable gases which is withdrawn via conduit 304 from decompression vessel FL03 and sent to the recycle gas compressor CP03. CP03 compresses decompression gas withdrawn from FLO3 to 40 bar. Recompressed gas exiting from CP03 is passed via conduit 305 to the synthesis gas stream in conduit 301 as recycle gas for renewed absorption in absorption apparatus AV03.

Laden methanol decompressed to 12 bar is withdrawn from decompression vessel FL03 in the bottom region, warmed in indirect heat exchanger WT03, sent via conduit 305 to decompression valve VA13, decompressed to 6 bar and simultaneously sent to decompression vessel FL13. In decompression vessel FL13 laden methanol already partially decompressed and thus partially regenerated is further regenerated (decompression regeneration) to liberate a decompression gas again containing carbon monoxide in addition to other valuable gases. Decompression gas liberated in FL13 is withdrawn via conduit 306 and sent to recycle gas compressor CP13. CP13 compresses decompression gas withdrawn from FL13 from 6 bar to 12 bar. Compressed decompression gas from CP13 is sent via conduit 307 to indirect heat exchanger WT03, cooled therein and after combination with decompression gas from conduit 304 sent via conduit 308 to recycle gas compressor CP03 for further compression to 40 bar.

Laden methanol withdrawn from the bottom region of decompression vessel FL13 is already markedly depleted in carbon monoxide as a result of the upstream decompression regenerations in FL03 and FL13 but contains sufficient amounts of hydrogen sulfide for conversion of the metal carbonyls absorbed in AV03 into metal sulfides. To accelerate the conversion into metal sulfides laden methanol is initially sent via conduit 309 to indirect heat exchanger WT13 and therein warmed to a temperature sufficient for the sulfide precipitation. Warmed laden methanol is sent via conduit 310 to treatment vessel AB02 which in terms of its configuration corresponds to the treatment vessel shown in FIG. 2. As shown in FIG. 2 the treatment vessel has an upper scrubbing region W03 and a lower residence time region V03, wherein the residence time region in turn has an upper reaction zone R03 and a lower settling zone A03. Laden methanol is initially supplied to the reaction zone R03 via conduit 310. Reaction zone R03 is irregularly filled with packing bodies to increase the internal surface area. Laden methanol traverses the reaction zone R03 with a residence time of at least 5 hours and metal carbonyls in the laden methanol are largely completely reacted with hydrogen sulfide to afford metal sulfides with precipitation of the metal sulfides. Sedimented metal carbonyls collect in settling zone A03 as sulfide sludge and via conduit 311 are withdrawn from treatment vessel AB03.

Supernatant in the form of the laden methanol generated in addition to the sulfide sludge is withdrawn from the reaction zone R03 via conduit 311, prewarmed in indirect heat exchanger WT23 and via conduit 312 sent to vessel H03 for hot regeneration. The gas mixture generated in the hot regeneration comprises especially hydrogen sulfide and vaporous methanol. It is withdrawn via conduit 313 and sent for further treatment, for example condensative removal of the gaseous methanol and sending the thus obtained dry hydrogen sulfide to a Claus plant for sulfur synthesis. Regenerated methanol is passed via conduit 314 and subsequently either via conduit 315 to the absorption apparatus AV03 or via conduit 316 to the scrubbing region W03 of the treatment vessel AB03. Before being sent to the absorption apparatus AV03 and/or scrubbing region W03 methanol is optionally recompressed with a compressor (not shown).

Metal carbonyls unconverted into metal sulfides also outgas from the residence time region V03 of the treatment vessel AB03, pass through the gas-permeable tray B03 and into scrubbing region W03 where they are absorbed by regenerated methanol supplied via conduit 316. A liquid layer F03 comprising regenerated methanol is formed above gas-permeable tray B03. Liquid layer F03 effects cooling of the metal carbonyls outgassing from V03, i.e. ensures that, once absorbed in the regenerated methanol, metal carbonyls are not desorbed again through cooling. Methanol laden with metal carbonyls may subsequently be recycled via conduit 317 into residence time region V03 where metal carbonyls originally ejected there are sent to the precipitation as metal sulfides in the reaction zone and settling zone A03, R03. Valuable gases not absorbed by regenerated methanol in W03 such as carbon monoxide or hydrogen are withdrawn via conduit 317, recompressed in a compressor and recycled to the absorption apparatus as a recycle gas stream (not shown).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

1 Process (prior art)
101-108 Conduit
A01 Settling zone
R01 Reaction zone
V01 Residence time vessel
WT01 Indirect heat exchanger
WK01 Carbonyl scrubbing column
2 Treatment vessel (invention)
201-206 Conduit
A02 Settling zone
R02 Reaction zone
V02 Residence time region
W02 Scrubbing region
B02 Gas-permeable tray
F02 Liquid layer
3 Process (invention)
301-317 Conduit
AV03 Absorption apparatus
VA03, VA13 Decompression valve
WT03, WT13, WT23 Indirect heat exchanger
FL03, FL13 Decompression vessel
CP03, CP13 Recycle gas compressor
AB03 Treatment vessel
A03 Settling zone
R03 Reaction zone
V03 Residence time region
W03 Scrubbing region
B03 Gas-permeable tray
F03 Liquid layer
H03 Vessel for hot regeneration

The invention claimed is:

1. A process for removal of metal carbonyls from crude synthesis gas in a gas scrubbing process with a physical scrubbing medium, the process comprising the steps of:
sending a scrubbing medium laden at least with hydrogen sulfide ($H_2S$) and metal carbonyls from an absorption apparatus to a treatment vessel having a residence time region and a scrubbing region, wherein the metals of the metal carbonyls are at least partially precipitated from the scrubbing medium as metal sulfides in the residence time region and the scrubbing region is supplied with a regenerated scrubbing medium, wherein the residence time region and the scrubbing region are separated from one another by a gas-permeable tray;
forming a regenerated scrubbing medium-comprising liquid layer adjacent to the gas-permeable tray in the scrubbing region;
passing metal carbonyls outgassing from the residence time region through the gas-permeable tray and at least partially absorbing the metal carbonyls by the regenerated scrubbing medium in the scrubbing region, wherein a scrubbing medium comprising metal carbonyls is obtained; and
cooling the metal carbonyls outgassing from the residence time region by the liquid layer.

2. The process according to claim 1, wherein the scrubbing medium comprising metal carbonyls is transferred from the scrubbing region into the residence time region in order to precipitate as metal sulfides the metals in the scrubbing medium comprising metal carbonyls in the residence time region of the treatment vessel.

3. The process according to claim 1, wherein the scrubbing medium laden at least with hydrogen sulfide ($H_2S$) and metal carbonyls is sent to a decompression regeneration for removal of carbon monoxide (CO) before the scrubbing medium is sent to the treatment vessel.

4. The process according to claim 3, wherein the scrubbing medium laden at least with hydrogen sulfide ($H_2S$) and metal carbonyls is supplied with a stripping gas for additional stripping of carbon monoxide (CO) in the decompression regeneration.

5. The process according to claim 3, wherein the decompression regeneration affords a decompression gas which is recompressed and recycled to the absorption apparatus as recycle gas.

6. The process according to claim 3, wherein the decompression regeneration comprises a plurality of pressure stages.

7. The process according to claim 1, wherein the scrubbing medium laden at least with hydrogen sulfide ($H_2S$) and metal carbonyls is warmed before it is sent to the treatment vessel.

8. The process according to claim 1, wherein the scrubbing medium laden at least with hydrogen sulfide ($H_2S$) and metal carbonyls is sent to the residence time region of the treatment vessel.

9. The process according to claim 1, further comprising an absence of cooling the metal carbonyls outgassing from the residence time region to the scrubbing region in an indirect heating external heat exchanger.

10. The process according to claim 1, wherein the residence time region comprises a reaction zone and a settling zone.

11. The process according to claim 10, wherein the settling zone of the residence time region comprises a conical tray for collecting the precipitated solids.

12. The process according to claim 10, wherein packing bodies and/or structured packings are arranged in the reaction zone to increase the internal surface area of the reaction zone.

13. The process according to claim 10, wherein the treatment vessel does not comprise an indirect heat exchanger.

14. A process for removal of metal carbonyls from crude synthesis gas in a gas scrubbing process with a physical scrubbing medium, the process comprising the steps of:
introducing a crude synthesis gas to an absorption unit in the presence of methanol to produce a scrubbing medium comprising hydrogen sulfide, methanol, and metal carbonyls;
providing a treatment vessel comprising a residence time region configured to precipitate solids from a solution or suspension and a scrubbing region disposed above the residence time region, wherein the residence time region and the scrubbing region of the treatment vessel are in fluid communication and are separated from one another by a gas-permeable tray;
introducing the scrubbing medium to the residence time region of the treatment vessel under conditions effective to at least partially precipitate the metal carbonyls from the scrubbing medium as metal sulfides in the residence time region;
supplying the scrubbing region with a regenerated scrubbing medium;
forming a regenerated scrubbing medium-comprising liquid layer adjacent to the gas-permeable tray in the scrubbing region;
passing metal carbonyls outgassing from the residence time region through the gas-permeable tray and at least partially absorbing the metal carbonyls by the regenerated scrubbing medium in the scrubbing region, wherein a scrubbing medium comprising metal carbonyls is obtained; and
cooling the metal carbonyls outgassing from the residence time region by direct contact with the liquid layer.

15. The process according to claim 14, further comprising an absence of cooling the metal carbonyls outgassing from the residence time region to the scrubbing region in an indirect heating external heat exchanger.

16. The process according to claim 14, wherein the residence time region comprises a reaction zone and a settling zone.

* * * * *